US012566741B1

(12) United States Patent
Sim et al.

(10) Patent No.: US 12,566,741 B1
(45) Date of Patent: Mar. 3, 2026

(54) METHOD AND SYSTEM FOR PROVIDING EFFICIENT METADATA ANALYTICS IN A DISTRIBUTED STORAGE SYSTEM

(71) Applicant: DATA DIRECT NETWORKS, INC., Chatsworth, CA (US)

(72) Inventors: Hyogi Sim, Blacksburg, VA (US); David Jones Craft, Durango, CO (US); Konstantinos Chasapis, Hamburg (DE)

(73) Assignee: Data Direct Networks, Inc., Chatsworth, CA (US)

( * ) Notice: Subject to any disclaimer, the term of this patent is extended or adjusted under 35 U.S.C. 154(b) by 0 days.

(21) Appl. No.: 19/019,725

(22) Filed: Jan. 14, 2025

(51) Int. Cl.
| | |
|---|---|
| *G06F 16/00* | (2019.01) |
| *G06F 16/21* | (2019.01) |
| *G06F 16/22* | (2019.01) |
| *G06F 16/25* | (2019.01) |
| *G06F 16/27* | (2019.01) |

(52) U.S. Cl.
CPC .......... *G06F 16/221* (2019.01); *G06F 16/212* (2019.01); *G06F 16/2282* (2019.01); *G06F 16/258* (2019.01); *G06F 16/27* (2019.01)

(58) Field of Classification Search
CPC ................. G06F 16/221; G06F 16/212; G06F 16/2282; G06F 16/258; G06F 16/27
See application file for complete search history.

(56) References Cited

U.S. PATENT DOCUMENTS

| | | | |
|---|---|---|---|
| 2019/0171756 A1* | 6/2019 | Patavardhan | ....... G06F 21/6227 |
| 2020/0133945 A1* | 4/2020 | Friedt | ................. G06F 16/2471 |
| 2022/0147527 A1* | 5/2022 | Hartsing | ............ G06F 16/2264 |

FOREIGN PATENT DOCUMENTS

| | | | | |
|---|---|---|---|---|
| CN | 116561134 B | * | 11/2023 | ......... G06F 16/2246 |

* cited by examiner

*Primary Examiner* — Alexander Khong
(74) *Attorney, Agent, or Firm* — Rosenberg, Klein & Lee

(57) ABSTRACT

The system metadata exploration service is directly embedded in a distributed data storage system to enable presentation of structured system metadata using a relational data model and dynamic mapping of structured system metadata to relational tables, all without incurring an additional snapshot and copy overhead, thus avoiding utilization of additional nodes and reducing the resources requirements. The system metadata analytics enables the use of the SQL interface for exploring system metadata, thus enhancing system adaptability and flexibility.

20 Claims, 8 Drawing Sheets

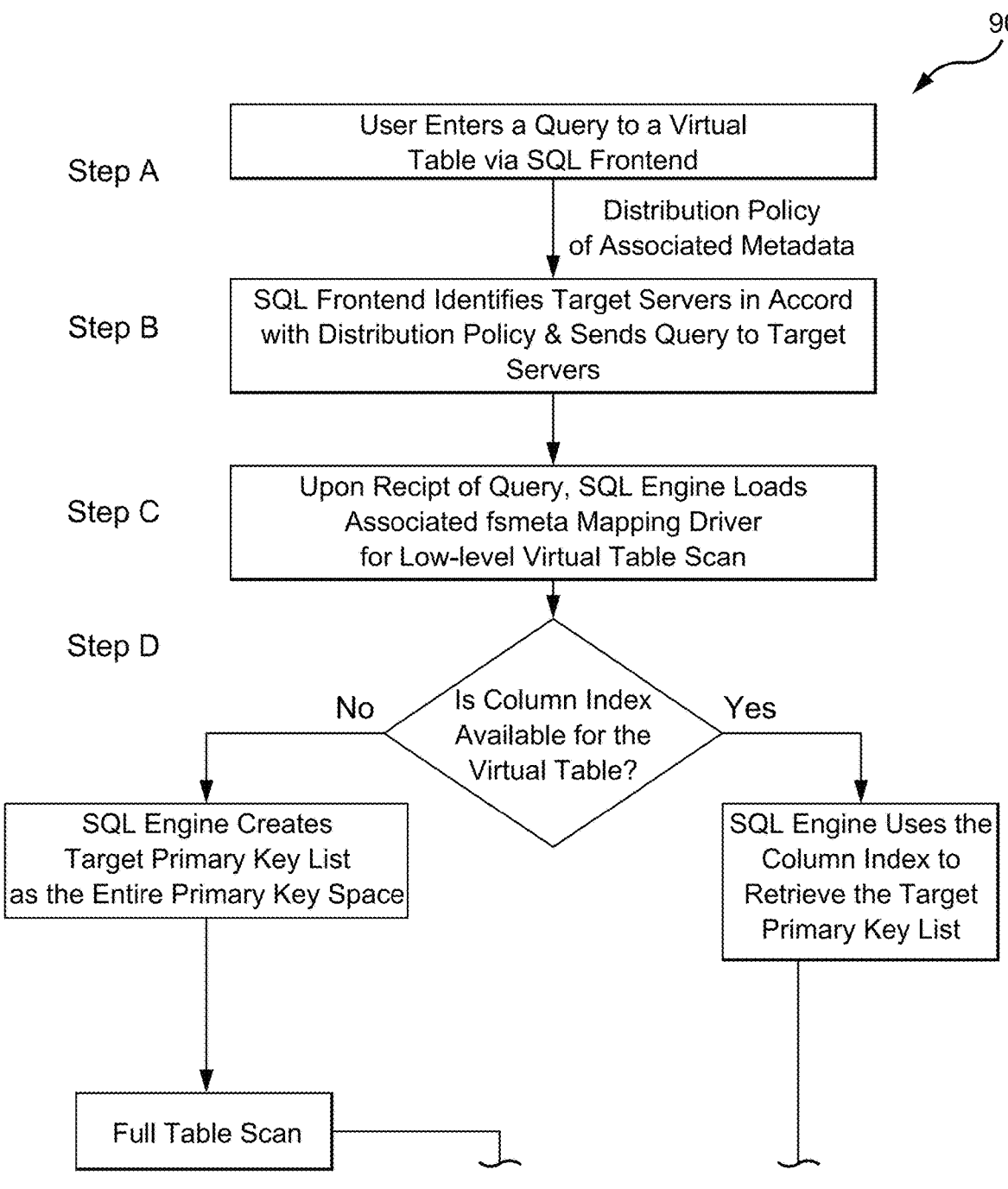

90

Step A — User Enters a Query to a Virtual Table via SQL Frontend

Distribution Policy of Associated Metadata

Step B — SQL Frontend Identifies Target Servers in Accord with Distribution Policy & Sends Query to Target Servers Step C — Upon Recipt of Query, SQL Engine Loads Associated fsmeta Mapping Driver for Low-level Virtual Table Scan Step D — Is Column Index Available for the Virtual Table?

No — SQL Engine Creates Target Primary Key List as the Entire Primary Key Space

Yes — SQL Engine Uses the Column Index to Retrieve the Target Primary Key List

Full Table Scan

*FIG. 5*

METHOD AND SYSTEM FOR PROVIDING EFFICIENT METADATA ANALYTICS IN A DISTRIBUTED STORAGE SYSTEM

FIELD OF THE INVENTION

The present invention addresses metadata management, and particularly, efficient metadata access and analytics in distributed data storage systems.

In addition, the present invention addresses a distributed data storage system integrated directly with the subject metadata analytics services instead of requiring a conventional burdensome deployment of metadata analytics in additional data migrating systems.

The present invention also addresses an efficient method for system metadata analytics in data storage systems, where, due to the absence of snapshot and copy routines, the novel approach delivers high performance, even in large-scale environments.

The subject invention is further directed to a metadata exploration approach in large-scale distributed data storage systems configured for enabling a dynamic mapping of structured system metadata to relational tables, all without incurring an additional snapshot and copy overhead associated with existing approaches, thus avoiding utilization of additional clusters, or nodes, outside the distributed data storage system which would be responsible for the metadata exploration services.

Moreover, the present invention addresses highly efficient analytics approach for system metadata in a distributed data storage system which is free of creating a redundant snapshot copy of the system metadata to provide the metadata exploration services, thus effectively reducing the resources requirement.

In addition, the present invention addresses an efficient system metadata analytics which enables the use of the widely adapted SQL (Structured Query Language) interface for exploring system metadata, thus significantly enhancing system adaptability and flexibility.

Further, the present invention addresses an approach for efficient analytics of the system metadata in large-scale distributed data storage systems where the index structures are maintained up to date through the data storage system event queue, thus permitting to minimally affect the performance of foreground data service operations.

In overall concept, the present invention is designed to overcome the problem existing in the present large-scale distributed data storage systems with regard to metadata analytics that currently involves deployment of a separate system offering metadata exploration capability with a redundant copy of metadata snapshot from the original system. It is disadvantageously highly inefficient and costly to create and copy the snapshot from the original system, where the metadata snapshot is always behind the original system metadata, and where the external metadata system is not capable of supporting every metadata type from the original system, and moreover, where extra resources are required to run the additional system.

BACKGROUND OF THE INVENTION

Distributed data storage systems (also referred to herein as distributed storage systems) are commonly available data migration systems, which represent infrastructures that can split data across multiple physical servers, and often across more than one data center. Such systems typically take the form of a cluster of data storage unit with a mechanism for data synchronization and coordination between cluster nodes. During operation, data is replicated among multiple nodes (storage units), thus ensuring that data can still be served from available nodes in the event of failure.

Computer clusters of linked computers have been widely used to improve the performance over that provided by a single computer, especially in extended computations, for example, involving simulations of complex physical phenomena, etc. Conventionally, in a computer cluster, computer nodes (also referred to herein as client nodes, or data generating entities) are linked by high-speed network which permits the sharing of the computer resources and memory. Data transfers (also referred to herein as data migration) to or from the computer nodes are performed through a high-speed network and are managed by additional computer devices, also referred to herein as file servers. The file servers file the data migrating from multiple computer nodes and assign a new location for each computer node in the overall file system. Typically, data migrates from the file servers to be stored in a storage disk array, or solid-state storage devices, for storage and retrieval of large amounts of data as needed.

Metadata refers to "data about data". Customarily, metadata is defined as data providing information about one or more aspects of the data. Usually, the terminology "metadata" is used to summarize basic information about data. Specifically, the metadata may include information on means of creation of the data, purpose of the data, time and date of creation of the data, creator (or author) of the data, location of the data on a computer network where the data was created, standards used for creating data, file size, etc., and thus, metadata is beneficial for easing the tracking and operating with specific data.

System metadata, as one example of metadata types, provides variable insights, such as understanding user behavior, capacity planning, performance diagnose and optimization, and data classification. Typically, system metadata are organized to optimize the data path operation. The conventional approach to analyzing system metadata schematically presented in FIG. 1, may be cumbersome and inefficient since it includes deployment of an external (additional) system (different than an original data migration system, or original data storage system) offering system metadata exploration capability outside the original data migration system which requires a processing of a redundant copy of metadata snapshot received from the original data migration system. Unfortunately, it is costly to perform additional routines of creating and transmitting a snapshot copy of the metadata from the original data migration system to the external system and processing at the external system with returning the metadata exploration results to the original system for usage. Another shortcoming of the conventional metadata analytics approach, in addition to being highly cost inefficient, is that the metadata snapshot is always delayed with respect to the system metadata of the original data migration system, and the external metadata system cannot support every metadata type from the original data migration system. In addition, extra resources are required to run the separate system for providing metadata analytics services. The required resources and performance costs increase proportionally with the size/scale of the system, and thus may be undesirably high for supporting conventional metadata analytics services, especially for large-scale distributed data storage systems.

Methodologies are thus needed which would support efficient operation of distributed data storage systems (and particularly, large-scale distributed data storage systems), which would enable the analytics of structured system metadata without incurring the snapshot and copy overhead associated with existing approaches.

SUMMARY OF THE INVENTION

It is therefore an objective of the present invention to overcome the problems existing in the present distributed data storage systems with regard to metadata analytics that conventionally require the deployment of a separate (external) system offering metadata exploration capability and involving creation and processing of a redundant copy of system metadata snapshot from the original system, which is disadvantageously highly inefficient and costly in addition to having the metadata snapshots always delayed with regard to the original system metadata, and inability of the external system of supporting every metadata type from the original system, in addition to requiring utilization of extra resources to run the external system.

It is another objective of the present invention to provide a highly efficient method for system metadata exploration in distributed data storage systems, where, due to the avoidance of redundant snapshot and copies creation, transmission, and processing, the novel approach delivers high performance, even in large-scale environments.

It is a further objective of the present invention to provide a highly efficient approach for metadata analytics in distributed data storage systems without the requirement of a redundant snapshot and copy overhead associated with existing approaches.

It is an additional objective of the present invention to provide metadata analytics in distributed data storage systems which would enable the presentation of structured system metadata using a relational data model and where the metadata exploration service is directly integrated into the distributed data storage system instead of requiring the deployment of an additional system for rendering the metadata exploration service.

It is still the objective of the present invention to provide an efficient metadata analytics approach for distributed data storage systems where a collection of structured metadata adhering to a schema can be dynamically mapped to a relational table.

It is a further objective of the present invention to provide the system and method for metadata exploration service which is directly integrated with the distributed data storage system and does not necessitate the utilization of additional clusters, or nodes, to offer the metadata exploration service.

It is still an additional objective of the present invention to provide the efficient system metadata analytics in a large-scale distributed storage system which avoids creation of a redundant snapshot copy of the system metadata to provide the metadata exploration service, thus effectively reducing the additional resources requirement and performance costs.

It is an additional object of the present invention to provide an efficient approach for the system metadata analytics which enables the use of the widely adapted SQL interface for exploring system metadata, thus significantly enhancing system adaptability and flexibility.

It is still the objective of the present invention to provide an efficient system metadata analytics in a large-scale distributed data storage system involving a routine for maintaining the index structures up to date through the system event queue to minimally affect the performance of foreground data service operations.

In one aspect the present invention addresses a method for efficient metadata analytics in a distributed data storage system. The subject method is supported by a distributed data storage system which includes:

a storage sub-system operatively coupled to a CPU with a plurality of storage servers operatively coupled to the storage sub-system and the CPU, a system metadata exploration service sub-system operatively integrated with the storage sub-system, and a distributed system metadata storage sub-system (also referred to herein as the metadata storage sub-system) operatively coupled to the plurality of storage servers and the system metadata exploration service sub-system (also referred to herein as the metadata exploration service sub-system), where the distributed system metadata storage sub-system is configured with a plurality of system metadata record units (also referred to herein as the metadata record units) and at least one relational table operatively coupled to the plurality of system metadata record units. At least one data generation entity is operatively coupled to the CPU sub-system, the distributed system metadata storage sub-system, and the system metadata exploration service sub-system. A system metadata status changing request is generated by the data generating entity and includes either a request to create a new storage system metadata request or to update an existing storage system metadata. The data generating entity also produces a metadata exploration request (also referred to herein intermittently as the analysis request or the inspection request) which is received at the system metadata explorations service sub-system. The metadata exploration request is configured in SQL. The SQL metadata exploration request triggers the subject converting process, i.e., converting the metadata record units to relational rows/table, as will be detailed in the following paragraphs.

The subject system metadata exploration service sub-system is configured with an SQL (Structured Query Language) Frontend Processor Unit operatively coupled to the at least one data generating entity, an SQL Engine Processor Unit operatively coupled to the SQL Frontend Processor Unit, an Index Processor Unit operatively coupled to the SQL Engine Processor Unit, and an Infinia Queue Processor Unit operatively coupled to the Index Update Processor Unit.

The subject method includes the operations of:

transmitting system metadata status changing request to the distributed system metadata storage sub-system, resulting in changing the status of at least one of the plurality of system metadata record units in the distributed system metadata storage sub-system, followed by transmitting at least one of the plurality of system metadata record units to at least one target server of the plurality of storage servers in accordance with a predetermined distribution policy, transmitting at least one metadata exploration request from the data generating entity to the metadata exploration service sub-system, and upon receiving the metadata exploration request from the data generating entity, transforming, by the metadata exploration service sub-system, the structured system metadata associated with the at least one system metadata status changing request into the at least one relational table, and entering the at least one relational table in the distributed system metadata storage sub-system.

The subject method further proceeds with the following processing routines:

mapping, by the system metadata exploration sub-system, the at least one relational table to a predetermined schema adhered to the at least one structured system metadata, and entering the at least one relational table in the distributed system metadata storage sub-system, followed by maintaining, by the subject system metadata exploration sub-system, a catalog including at least one relational table, registering, by the system metadata exploration sub-system, a name of the at least one relational table and the predetermined schema adhered to the at least one system metadata, and entering, by the system metadata exploration sub-system, a column index for the at least one system metadata in the at least one relational table.

Upon receipt of at least one system metadata exploration request from the data generating entity, the system metadata exploration sub-system triggers the converting process (converting to relational rows/table) by producing a mapping driver configured for scanning the at least one relational table, retrieving a target system metadata's primary key using the column index, retrieving corresponding record units stored in the target server, and converting the corresponding record units in relational rows in the at least one relational table.

The subject method continues with generating a resulting buffer containing a plurality of rows matching said relational rows; and displaying the resulting buffer to the at least one data generating entity upon a plurality of relational rows in the relational table have been scanned.

Upon receiving the at least one system metadata exploration request, the SQL Frontend Processor Unit parses the request, obtains information of a target relational table identifying the at least one target server, and sends said at least one system metadata status changing request to the at least one target server indicated in that request.

The subject method further proceeds with the following routines:

upon receiving the at least one system metadata exploration request at the target server, retrieving, by the SQL Engine Processor Unit, the target relational table information, detecting a type of said target relational table, wherein the type being selected from a group consisting of a virtual relational table and a native relational table, and loading the mapping driver associated with the target relational table for a low-level target relational table scan operation.

The logic further proceeds to check, by the SQL Engine Processor Unit, if a column index exists for the target relational table, and, if the column index is available, using the column index to retrieve the target primary key list. If, however, the column index is not available, the SQL Engine Processor Unit creates the target primary key list as the entire primary key space, and performs a full scan operation for the target relational table. At this stage, the target metadata record units are in the original format of metadata (as produced by data servers). The SQL Mapper Processor Unit converts the scanned metadata record units into relational rows "on the fly" and fills the resulting buffer for sending back to the client (data generating entity). The converted rows (tables) are not permanently stored in the system, meaning that the associated relational tables only exist during the converting process, and thus are referred to as "virtual" relational tables. Once the converting process has been completed, the virtual relational tables are treated identical to other "native" relational tables. For example, the SQL Engine Processor Unit is configured to evaluate the constraints/predicates for the virtual tables in a manner similar to the evaluation of the native relational tables.

In the subject routine, the target primary key list is transmitted subsequently from the SQL Engine Processor Unit to the SQL Mapper Processor Unit, which identifies the mapping driver associated with the target relational table, and assigns the scan operation.

Preferably, upon obtaining the relational rows from the SQL Mapper Processor Unit, the SQL Engine Processor Unit evaluates constraints to the relational rows, and prepares the resulting buffer with rows matching the relational rows, and, upon processing said relational rows, sends the resulting buffer to the SQL Frontend Processor Unit.

In the present method, the logic performs the routine of configuring the at least one system metadata record unit with a key index and a value index, wherein the key index serves as a primary key for the relational row in the at least one relational table, and creates at least one column index for the at least one system metadata record unit, where the at least one column index corresponds to the primary key of the relational row and the value index of the at least one system metadata record unit.

Upon the at least one system metadata has been exposed to the at least one status changing request, the system metadata exploration service sub-system is notified of the at least one system metadata status change, and the changes applied to the key index and value index in accordance to the at least one system metadata status change, and the SQL Index Update Processor Unit asynchronously updates the column index.

In addition, the present method produces a message to the Infinia Queue Processor Unit corresponding to the at least one system metadata status change upon changing the status of the at least one system metadata, followed by consuming the message by the Index Updater Processor Unit, and updating the key index and value index according to the message.

In an additional aspect, the present invention addresses a distributed data storage system configured for efficient metadata analytics, which comprises:

a storage sub-system operatively coupled to the CPU with a plurality of storage servers operatively coupled to the storage sub-system and the CPU, a system metadata exploration service sub-system operatively integrated with the storage sub-system, and a distributed system metadata storage sub-system, also referred to herein as the Infinia KV sub-system, operatively coupled to the plurality of storage servers and the system metadata exploration service sub-system, where the distributed system metadata storage sub-system is configured with a plurality of system metadata record units and at least one relational table operatively coupled to the plurality of system metadata record units.

At least one data generation entity is operatively coupled with the CPU, the distributed system metadata storage sub-system, and the system metadata exploration service sub-system. At least one data generating entity is configured for generating and transmitting to the distributed system metadata storage sub-system at least one system metadata status changing request which may include a command to create a new storage system metadata or to update an existing storage system metadata. The system metadata is a structured system metadata. Transmitting the system metadata status changing request to the distributed system metadata storage sub-system results in changing the status of at least one of the plurality of system metadata record units in the distributed system metadata storage sub-system. Preferably, the system metadata record units are configured to be transmitted to at least one target server of the plurality of storage servers in accordance with a predetermined distribution policy.

In the subject system, the system metadata exploration service sub-system is configured with an SQL (Structured Query Language) Frontend Processor Unit operatively coupled to the at least one data generating entity, an SQL Engine Processor Unit operatively coupled to the SQL Frontend Processor Unit, an Index Processor Unit operatively coupled to the SQL Engine Processor Unit, and an Infinia Queue Processor Unit operatively coupled to the Index Update Processor Unit.

The present system metadata exploration service sub-system, is preferably configured to:

transform the structured system metadata associated with at least one system metadata status changing request into at least one relational table, enter at least one relational table in the distributed system metadata storage sub-system, map at least one relational table to a predetermined schema adhered to at least one structured system metadata, enter at least one relational table in said distributed system metadata storage sub-system, maintaining a catalog including at least one relational table, register a name of at least one relational table and the predetermined schema adhered to the at least one system metadata, enter a column index for at least one system metadata in the at least one relational table, load a mapping driver configured for scanning at least one relational table, and for retrieving a target system metadata's primary key using the column index and corresponding record units stored in the target server, and converting the corresponding record units in relational rows in the at least one relational table, and generate a resulting buffer containing a plurality of rows matching the relational rows for providing the resulting buffer to the at least one data generating entity upon a plurality of relational rows in the relational table have been scanned.

The SQL Frontend Processor unit is configured for, responsive to the at least one system metadata status changing request, parsing the at least one system metadata status changing request for obtaining information of a target relational table identifying the at least one target server, and sending the at least one system metadata status changing request to the at least one target server.

The SQL Engine Processor Unit is configured for, upon receiving the at least one system metadata status changing request at said target server, retrieving the target relational table information, detecting a type of the target relational table, and loading said mapping driver associated with the target relational table for a low-level target relational table scan operation.

The SQL Engine Processor Unit is further configured to check if a column index exists for the target relational table, and, if the column index is available, to use the column index to retrieve the target primary key list. If, however, the column index is not available, the SQL Engine Processor Unit is configured for creating the target primary key list as the entire primary key space, performing a full scan operation for the target relational table, and transmitting the target primary key list to the SQL Mapper Processor Unit for identifying the mapping driver associated with the target relational table, and assigning the scan operation.

In the subject system, the at least one system metadata record unit is configured with a key index and a value index, where the key index serves as a primary key for the relational row in the at least one relational table, where the at least one column index corresponds to the primary key of the relational row and the value index of the at least one system metadata record unit.

The subject system metadata exploration service sub-system is further configured to, upon the at least one system metadata has been exposed to the at least one status changing request, notify of the at least one system metadata status change, apply changes to the key index and value index in accordance with the at least one system metadata status change, and asynchronously update the column index.

These and other objects of the present invention will be apparent when taken in conjunction with the accompanying Patent Drawings and the distribution of the preferred embodiments of the subject invention.

DETAILED DESCRIPTION OF THE PREFERRED EMBODIMENT

Figure 1:
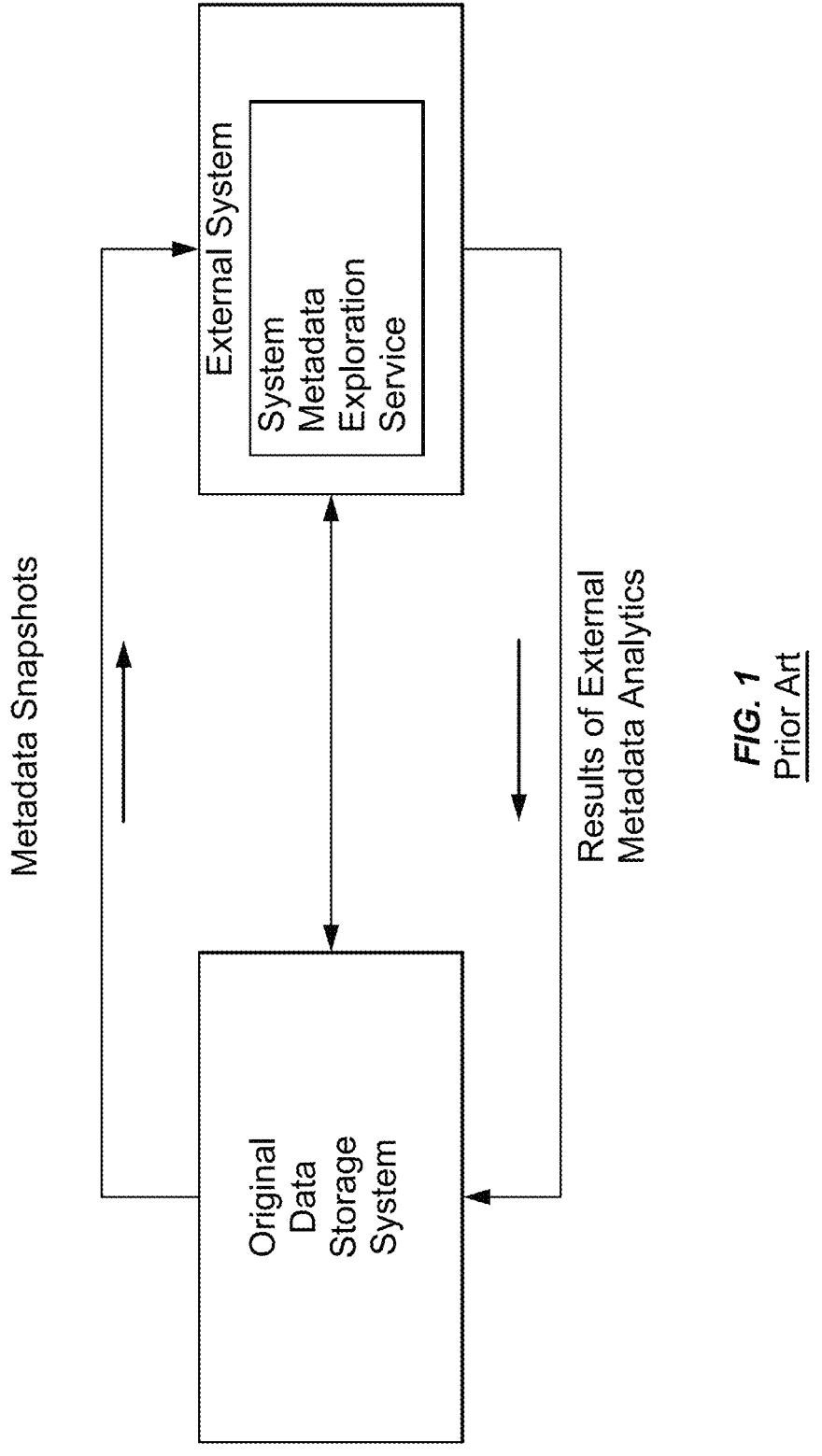
FIG. 1 schematically depicts the prior art system metadata analytics approach.
Figure 2:
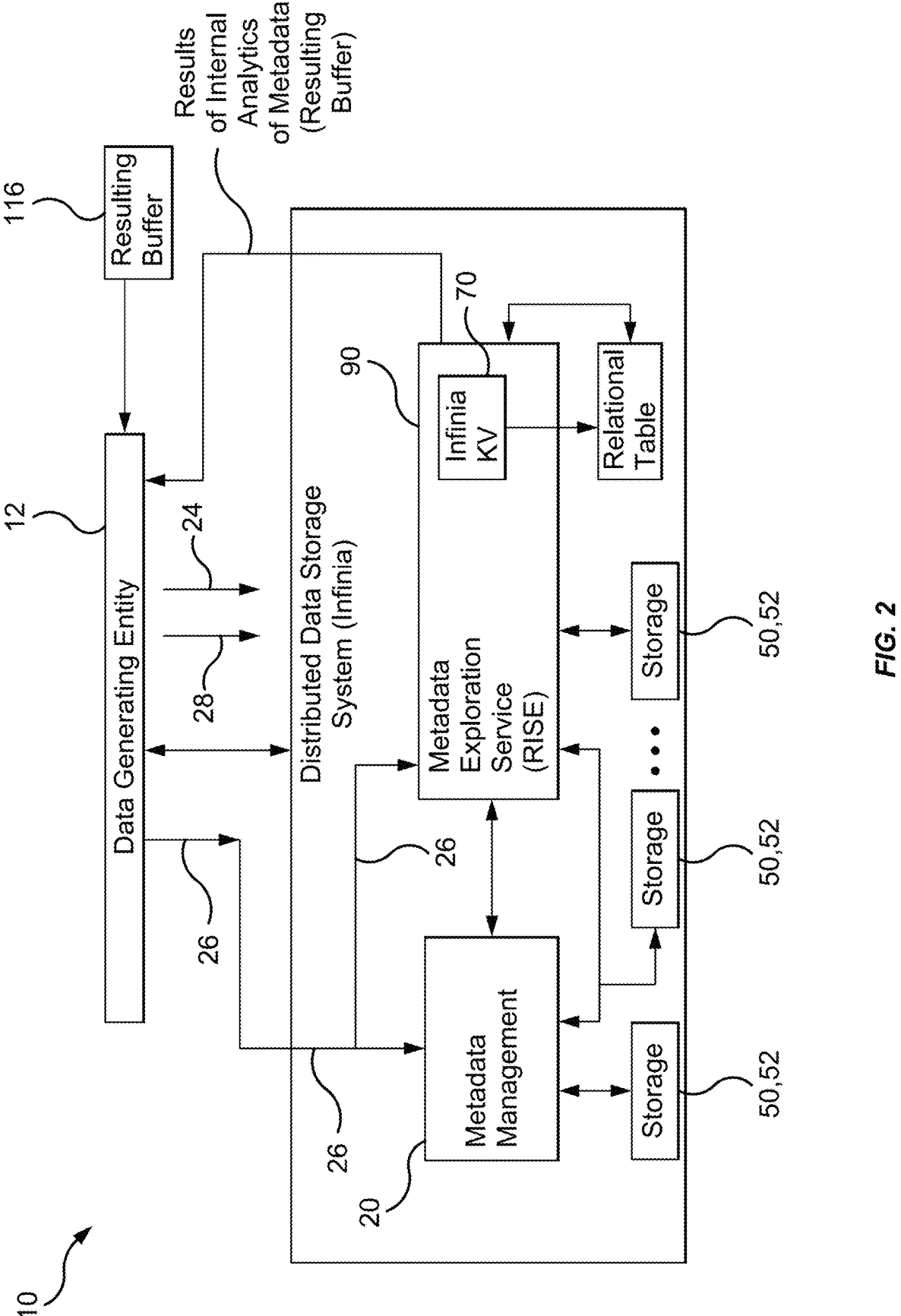
FIG. 2 is a schematic representation of the present data storage system containing the subject Metadata Exploration Service Sub-system directly integrated therewithin.
Figure 3:
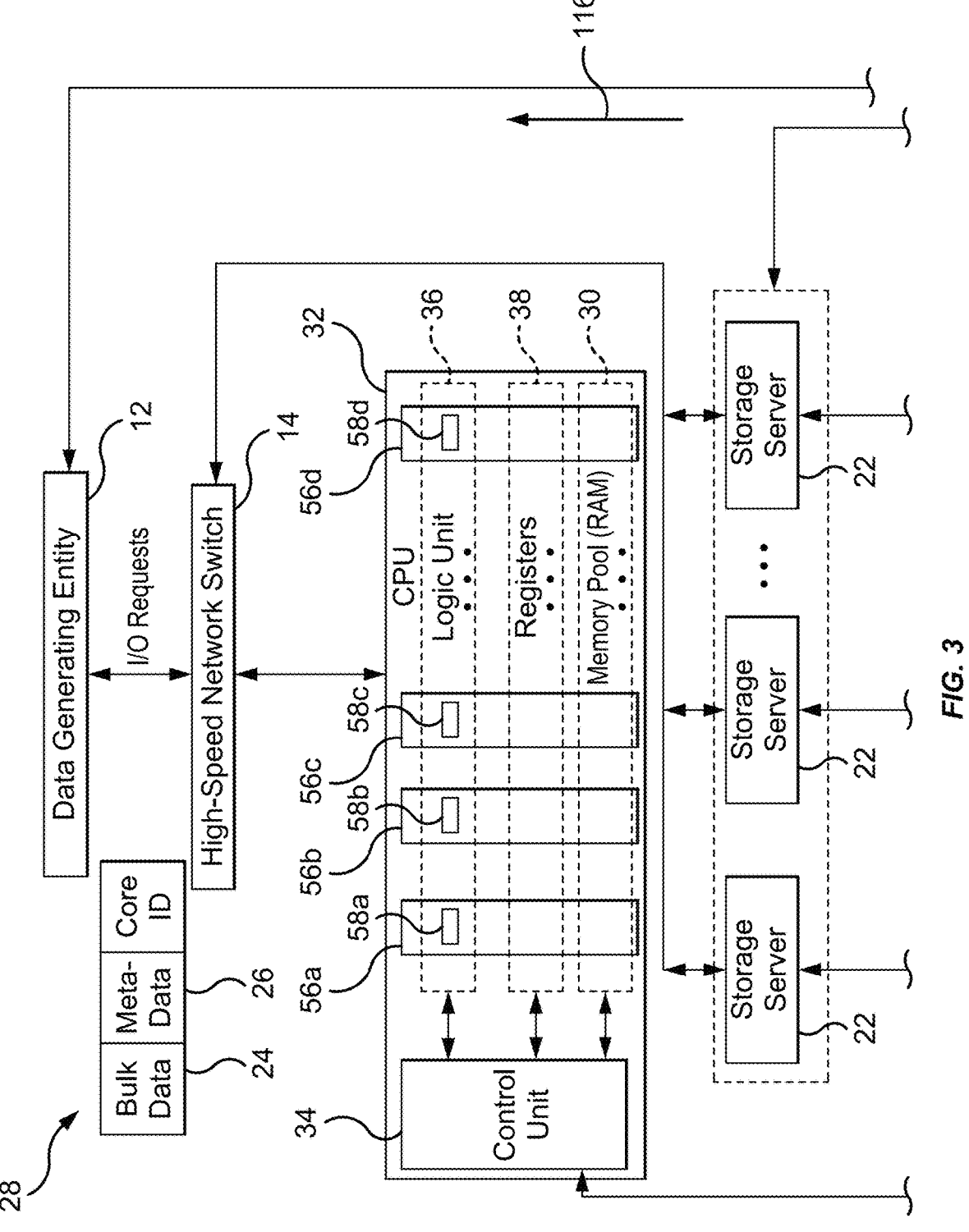
FIG. 3 depicts one of the embodiments of the present data storage system containing the embedded subject Metadata Exploration Service Sub-system.
Figure 3:
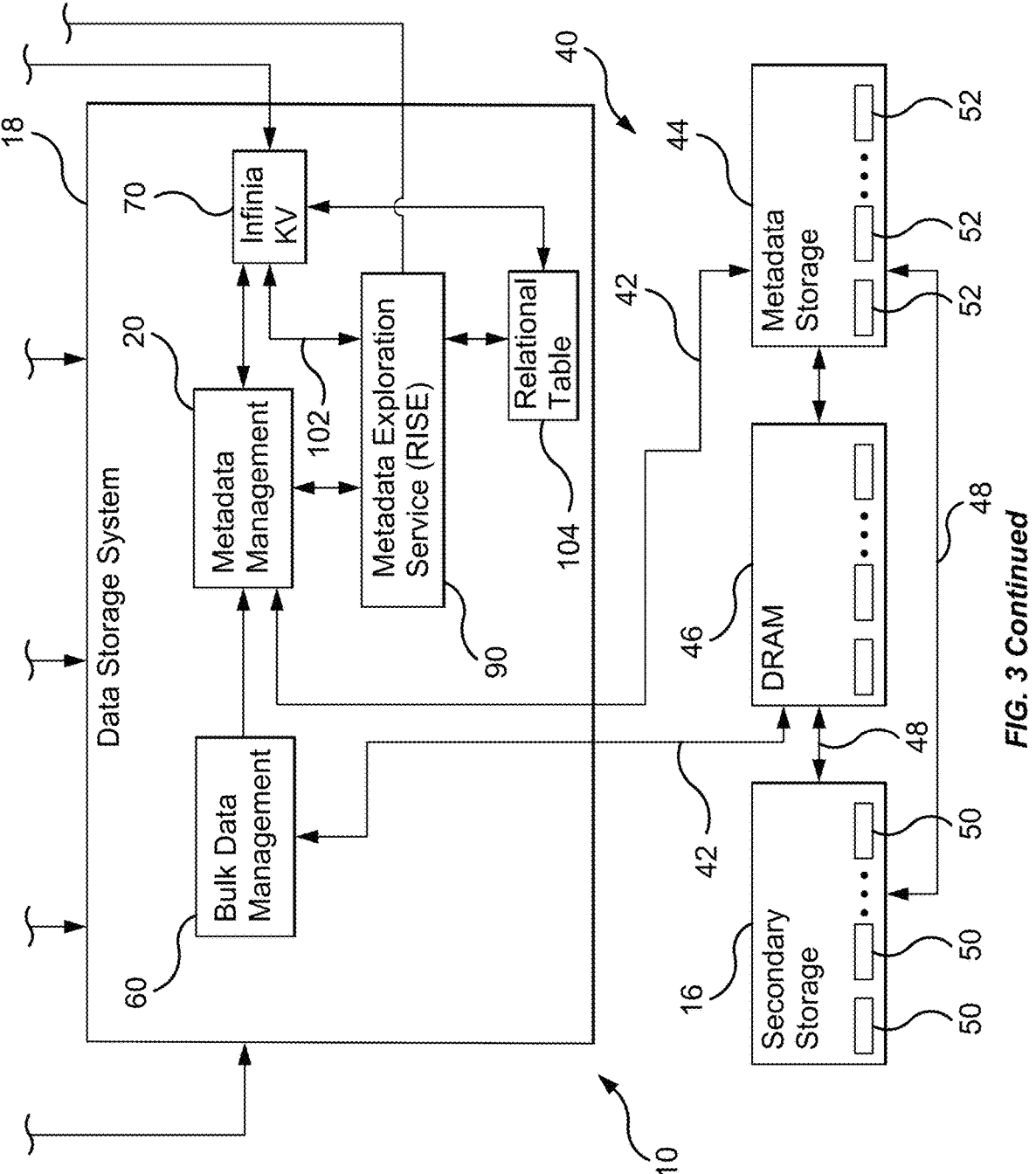

Referring to FIGS. 2-3, the subject system 10 (also referred to herein as a data migration system) supports data/metadata migration, management, access, and storage, as well as data/metadata retrieval, and metadata analytics, cooperates with at least one data generating entity 12 (which also may be referred to herein as a user, client, a compute node, etc.) through a high-speed network 14. Although a single data generating entity 12 is depicted in FIGS. 2-3, any number of data generating entities 12 may cooperate with the subject data migration system 10. The data generating entities 12 may be arranged in computing groups, or computer clusters, to perform complex computations of various types. The operation of the compute nodes is dependent on the system application.

The data generating entities 12 may function as servers, super-computing clusters, etc., and have the capability to "write" by outputting data (also referred to herein as "bulk" data) and metadata to, as well as "read" data and metadata from, the memory, also referred to herein as storage.

The present system 10, depicted in FIGS. 2-3, is envisioned as a distributed data storage system (or a distributed storage system) which is a data migration system configured for, among its numerous functions, for splitting data across multiple physical servers, and often across more than one data center. The present system 10 may be envisioned as a cluster of data storage units operatively coupled with a mechanism for data synchronization and coordination between cluster nodes. During operation, data are replicated among multiple nodes (storage units), thus ensuring that data can still be served from available nodes in the event of a failure.

The subject unique metadata analytics approach is applicable to and may be directly integrated into a distributed data storage system in numerous specific configurations, including a large-scale distributed data storage system, such as, for example, the Infinia distributed data storage system which may be configured with one computer cluster, or a plurality of computer clusters (also referred to as Infinia clusters). The Infinia cluster includes multiple computer hosts. Each computer host is coupled to other computer hosts within the Infinia cluster with a shared network having multiple network interfaces. Each computer host has a plurality of local storage devices, which may be also referred to as Core Affined Storage Targets (CATs).

Each computer host in the Infinia system is configured with an Agent which supports a Management Process running on the computer host to look after the nodes (also referred to as local clients) and their functionality. Each computer host is also configured with a corresponding Instance IO Server (or Instance) which supports an IO server process running on the computer host. Instances are generated (created) by the Agents. Instances "own" the local CATs and supply IO services to clients which may be represented by the local clients and remote clients.

The Infinia system further includes an ETCD Cluster, which is a highly available distributed configuration database that stores cluster configuration, runtime, layout table, agent registry, and Inventory. The ETCD Cluster also includes databases which reside in respective computer hosts. More details of the Infinia system (may also be referred to as the RED system) may be found at least in U.S. patent application Ser. Nos. 18/428,940, 18/485,538, and 18/504,434.

In one of numerous alternative embodiments, as an example only, but not to limit the scope of the present invention to this particular configuration of the data storage system, the present system 10 depicted in FIG. 3. may be envisioned as the data storage system for integrally embedding therein the present System Metadata Exploration Service sub-system 90 cooperating and/or configured with a Distributed System Metadata Storage sub-system (also referred to herein as an Infinia KV sub-system) 70 which will be detailed in further paragraphs.

As presented in FIG. 3, the memory/storage may include the primary (or buffer) memory 18 associated with the Central Processor Unit (CPU) in the form of the RAM memory pool, DRAM, as well as memory and storage structures associated with data storage system 18, and a secondary storage sub-system 16, where the data and metadata may persist, or form an external memory, as well as any other device. The secondary sub-system 16 may include an array of NVME devices, hard disk drives (HDDS) or other storage systems suitable for data storage and retrieval in the large-scale distributed data storage system 10.

The data storage system 18 may include, but not limited to, block storage system(s), object storage system(s), key-value storage system(s), and file system(s). Each type of these systems is configured with the subject metadata management unit 20 which functions to define, expose, and manage class-specific metadata types, policies, and metadata management methodologies, such as, for example, managing where the metadata resides and providing efficient access to that metadata over the lifetime of the data storage system 18.

The data generating entities 12 are connected through the high-speed network 14 to the data storage system 18 which includes several data storage servers 22 which manage bulk data 24 and metadata 26 management and access from and to the compute nodes (data generating entities) 12.

In the distributed storage system 10, the ratio of the compute nodes 12 to the data storage servers 22 may be in excess of thousands in certain applications. The data storage server 22 in the data storage system 18 makes a request for the compute nodes 12 in the same order as the requests are received at the data storage server 22, or, alternatively, the data storage system 18 makes a request from the data generating entities 12 in any manner applicable in the subject system 10.

During the "write" input/output (I/O) cycle of the compute node's operation, the bulk data 24, as well as the metadata 26 (in combination constituting a file 28 transmitted from the data generating entity 12 with an I/O request) may be transferred from the data generating entity's cache to the data storage servers 22. Responsive to the request containing file 28, the data storage servers 22 may place data in the data storage system 18, or other storage area, including the secondary storage sub-system 16, for subsequent retrieval upon receiving an I/O request from the data generating entity 12.

The high-speed network 14 functions as a high-speed switch and may be based on any of the network transport protocols, such as, for example, an infiniband (IB), fibre channel (FC), gigabytes ethernet (GIGE), etc.

A storage 30 is associated with CPU 32. The storage 30 is also referred to herein as primary memory, main storage, internal storage, cache memory, buffer memory, main memory, or RAM (random access memory), and may constitute an entire, or a portion, of the memory pool in the data distributed storage system 10. Memory pool 30 is a part of system 10 which holds data/metadata and instructions for data/metadata processing and other routines executed in the subject system 10. The memory pool 30 also may store program instructions or data/metadata for only as long as the programs they pertain to are in operation. Although shown in FIG. 3 as a part of the CPU 32, memory pool 30 may be an entity physically separated therefrom.

The CPU 32 includes control unit 34 which contains circuitry that uses signals to direct the CPU 32 to the stored program instructions. The control unit 34 cooperates with the arithmetic/logic unit (ALU) 36 and the memory pool 30. The ALU 36 executes all arithmetic and logical operations in system 10. The CPU 32 further includes registers 38 which provide temporary storage areas for instructions and/or data/metadata.

The CPU 32 is operatively connected to data storage system 18. The data storage system includes (or cooperates with) a memory sub-system 40 which is operatively coupled with the data storage system 18 through the memory bus 42. The memory subsystem 40 includes the NVM-based metadata storage 44. The memory sub-system 40 may also include other storages, such as for example, a dynamic random access memory (DRAM) 46 which is operatively interconnected with the NVM-based metadata storage 44. The memory sub-system 40 is connected to the secondary storage sub-system 16 via the I/O bus 48. The architecture of the subject large-scale distributed storage system 10 is an exemplary embodiment only, and other alternative imple-
mentations of the subject system are applicable to the
present invention concept.

For example, the secondary storage 16 may be combined
with, or substituted by, the NVM-based memory sub-system
40, so that the NVM-based memory sub-system 40 may be
considered a secondary storage operatively connected
directly to the data storage system 18. In this case scenario,
the secondary storage 16 includes NVM-e devices 50 (for
persistent storage of the metadata) which may be directly
coupled to the NVM-e devices 52 of the NVM-based
metadata storage 44.

The CPU 32 of the subject system 10 constitute a multi-
port processor system which is configured with a plurality of
independent processing units (referred to herein as cores) 56
(depicted in FIG. 3 as cores 56a, 56b, 56c, 56d, . . . , 56n)
each of which reads and executes program instructions
independently each from the other.

Although operating strictly independent one from
another, cores 56 may be physically interconnected via
topologies which include bus, ring, two-dimensional mesh,
crossbar, etc. The cores 56 may constitute homogeneous
cores which include identical cores or alternatively, a het-
erogeneous core system may be used where cores 56 are not
identical. The cores 56 in the subject system 10 may be
integrated into a single circuit die (such as chip multi-
processor or CMP), or can reside on multiple dies in a single
chip package. Each core 56 runs a respective thread 58
(58a, . . . , 58n) which is specifically assigned to such core.
Each thread may use its only source pre-allocated (or
attributed) to its respective core. In the subject architecture,
cores 56 may implement messages passing or shared-
memory inter-core communications through interconnect
topologies. However, for the purpose of the metadata storage
and retrieval in accordance with the principle of the present
invention, the threads running on different cores are inde-
pendent with respect to threads running on other cores.

As depicted in FIG. 3, the data storage system 18 provides
a memory management storage/retrieval channel (also
referred to herein as a metadata management unit) 20 for the
metadata storage and any retrieval. In addition, the data
storage system 18 provides a bulk data management channel
(bulk data management unit) 60 for addressing bulk data
storage retrieval operation in the subject system 10.

Although being capable of migrating/storing/retrieving
both bulk data 24 and metadata 26, the subject system 10
will be further described with emphasis on metadata ana-
lytics based on the presentation of structured system meta-
data in large-scale distributed storage system using a rela-
tional data model without incurring the snapshot and copy
overhead associated with conventional approaches.

Figure 4:
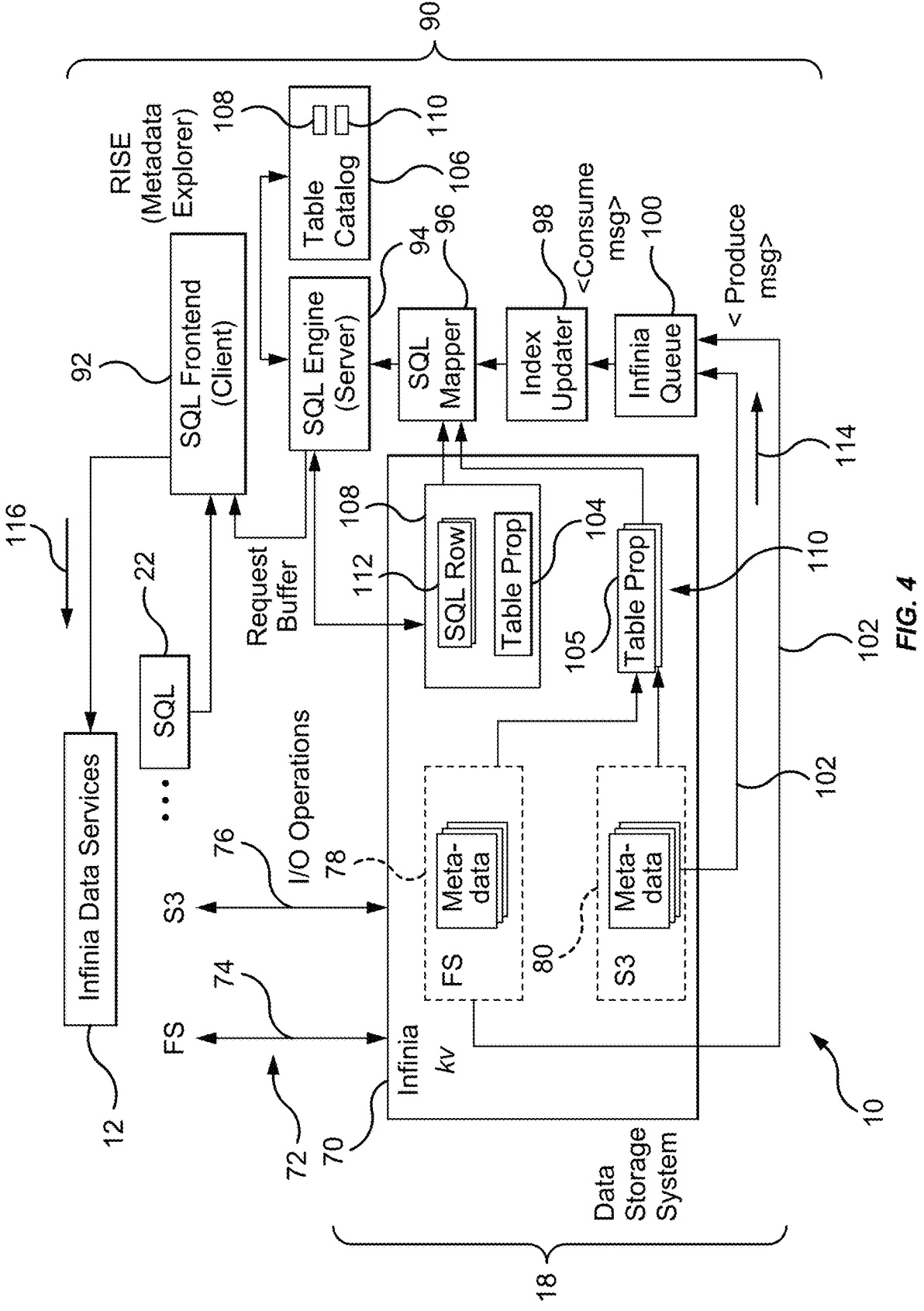
FIG. 4 is representative of the subject system architecture.

Referring to FIG. 4, the subject system architecture of the
proposed efficient metadata analytics, and in association
with the architecture of the exemplary large-scale distributed
storage system 10 shown in FIG. 3, the present system 10
uses a distributed key value (KV) store, referred to herein as
an Infinia KV sub-system 70, which is included into the data
storage system 18 and is assumed for metadata storage. As
an example, the Infinia KV sub-system 70 may be opera-
tively coupled with the NVM-Based Metadata Storage 44
and the Data Storage Servers 22. As depicted in FIG. 4, the
I/O operations 72 from users and applications (also referred
to herein as data generating entities 12, or Infinia data
services) create or update storage system metadata in the
Infinia KV sub-system 70. I/O operations 72 may include the
file I/O operations 74 which update the file system metadata
(depicted as FS metadata 74 in FIG. 4), and the object I/O operations 76 which update the object metadata (depicted as
S3 metadata 76 in FIG. 4). The corresponding FS metadata
records 78 and S3 Metadata records 80, respectively, are
distributed across multiple servers 22 by a distribution
policy (such as distributed hashing) in the present large-
scale distributed storage system 10.

The data storage system 18, particularly, the metadata
management unit 20 of the subject system 10, further
includes integrated therewithin, or, alternatively, operatively
coupled with, the Metadata Exploration Service Sub-system
(also referred to herein as Metadata Explorer) 90 which is
presented in FIGS. 3 and 4 as RISE (Relation Interface for
Structured Entities).

As detailed in FIG. 4, the Metadata Explorer 90 further
includes:

(a) SQL Frontend unit 92 which constitutes the client-side
component including the command line utility with
which the end users (clients, or data generating entities
12) interact with the subject Metadata Exploration
Service sub-system 90.

(b) SQL Engine unit 94 which is a server-side component
that provides a relational data abstraction and SQL
query execution service on top of the distributed Key-
Values store 70.

(c) SQL Mapper unit 96 which is a server-side component
which transforms structured system metadata into the
relational representation on the fly.

(d) Index Updater unit 98 which is a server-side compo-
nent which asynchronously updates the index structure
for fast look-up operations.

(e) Infinia Queue unit 100 which is a server-side compo-
nent that notifies the Index Updater unit 98 with system
metadata update events from storage system data ser-
vices. The system metadata update events are provided
from the storage system data services, for example, the
Infinia KV sub-system 70 to the Infinia Queue unit 100,
as messages delivered to the Infinia Queue unit 100 via
communication channel 102.

Mapping Key-Value Records to Relational Tables

System metadata records 78, 80 typically adhere to a
well-defined schema. For example, all KV records of the FS
metadata 78 conform to a predefined schema, and similarly,
all KV records of the S3 metadata 80 also conform to a
predefined schema. In order to be useful, metadata needs to
be standardized. The standardization in question includes
agreeing on language, spelling, date format, etc. A key
component of metadata is schema. Metadata schema out-
lines the overall structure for the metadata. Metadata schema
describes how the metadata is set up, and usually addresses
standards for common components of metadata, such as
dates, names, and places. There are also discipline-specific
schemas used to address special elements specific to or
needed by a given discipline.

In the subject system 10, particularly, with the help of the
SQL Mapper unit 96, a relational table 104 maps to a
specific metadata schema, with each metadata KV record 78,
80 that adheres to the schema becoming a row (SQL Row
unit 112) in the relational table 104. The relational tables 104
that are mapped to the system metadata are called virtual
tables, as opposed to the native tables.

During scanning of the metadata, the target metadata
record units are in the original format of metadata (as
produced by data servers). The SQL Mapper Processor Unit
converts the scanned metadata record units into relational
rows "on the fly" and fills the resulting buffer for sending
back to the client (data generating entity). The converted
rows (tables) are not permanently stored in the system, meaning that the associated relational tables only exist during the converting process, and thus are referred to as "virtual" relational tables. Once the converting process has been completed, the virtual relational tables are treated identical to other "native" relational tables. For example, the SQL Engine Processor Unit is configured to evaluate the constraints/predicates for the virtual tables in a manner similar to the evaluation of the native relational tables.

In the present system, a collection of information is organized in predefined relationships where data/metadata are stored in numerous tables (also referred to herein as "relations", or relational tables, or relational databases) of columns (attributes) and rows (records or tuples), making it easy to see and understand how different data/metadata structures relate to each other. There are also relationships (also referred to herein as logical connections) between different tables, established on the basis of interaction among these tables. Usually, attributes (columns) specify a data type, and each record (or row) contains the value of that specific data type. All relational tables have an attribute known as the primary key, which is a unique identifier of a row, and each row can be used to create a relationship between different tables using a foreign key, which is a reference to a primary key of another existing table.

The SQL server, cooperating with the SQL Engine unit 94 and/or SQL Mapper unit 96, as well as the SQL Row unit 112, is configured to support the relational database (relational tables), and to establish relationships between relational tables, where each relational table 104 is connected to other relational tables 104 using Primary-Foreign Key constraints. Table relationships in the SQL server may be established, for example, as one-to-one type, or one-to-many type, or many-to-many type. In the one-to-one type of relationship, one record of the first table will be linked to zero or one record of another table. in the one-to-many type relationship, a single record from one table can be linked to zero or more rows in another table. In the many-to-many type relationship, each row in one table is related to many rows in another table and vice versa.

The present system implements a relational database management system (RDBMS) and provides the SQL database service for manipulating the relational tables. Relational tables provide a more rigid, structured way of storing data. The Structured Query Language (SQL) is used by users to interact (e.g., query metadata) with the subject system. SQL is widely adopted for its declarative nature, allowing end-users to easily query and manipulate data without needing to address the complex internal operations. SQL has been chosen in the subject system also for interaction with and between the Server-side logic units, i.e., the SQL Engine unit 94, the SQL Mapper unit 96, the SQL Row unit 112, as well as the SQL relational tables and the SQL Frontend unit 92 used in the present system. The SQL Engine unit 94 cooperating with the SQL Mapper unit 96, as well as the SQL Row unit 112 utilized in the present Metadata Exploration Service Sub-system 90, executes SQL queries 72, 74, 76, retrieves metadata, and edits metadata by updating, deleting, or creating new records 78, 80.

The SQL Engine unit 94 maintains the system table catalog 106 that includes both native tables 108 and virtual tables 110. Users can interact with virtual tables 110 similarly to the native tables 108, with the exception that virtual tables cannot be modified. The virtual table is analogous to read-only, un-materialized view of the traditional database systems.

As presented in FIG. 4, for native SQL tables 108, the system maintains both the SQL rows Unit 112 and the Table Prop 104. Table Prop 104 is the information about the table itself (metadata of the SQL table), and the SQL rows 112 are the tuples/records inside the table. For virtual tables 110, the system supports Table Prop 105, which is the metadata of the table. The SQL rows are generated from FS Metadata records 78 and S3 Metadata records 80 by the SQL Mapper 96 upon receipt of a retrieve/search request. The original key from the records 78, 80 serves as the primary key for a corresponding row in table 110. For example, a <KEY, VALUE> record of the FS Metadata (also referred to herein as fsmeta) type can be formatted as: KEY: 11223344 (inode number of the associated file)

VALUE: {uid=1000, gid=1000, size=1024, . . . } (file attributes)

The associated row in the fsmeta table can be presented as:

| Inode No. (Primary Key) | uid | gid | size | . . . |
|---|---|---|---|---|
| 11223344 | 1000 | 1000 | 1024 | . . . |

In addition to the Primary Key, column indexes can be added to facilitate fast table scans, similar to the native tables 108. For example, the index key value record for the row in the fsmeta table is formed as:

KEY: 1024 (the value of the size column)

VALUE: 11223344 (the primary key of the row)

In order to include a system metadata type in the Metadata Exploration Service sub-system 90, the target metadata type should be registered to the system through SQL Mapper unit 96. Specifically, the SQL Mapper unit 96 registers the name of the relational table 104, e.g., fsmeta, and its associated metadata schema, e.g., FS metadata schema. For every registered metadata type, the SQL Mapper unit 96 implements a mapping driver, e.g., fsmeta mapping driver. The mapping driver is responsible for 1) retrieving the associated KV records within the server, and 2) converting each KV record 78, 80 to a relational table row.

Metadata Exploration Service Operation

Figure 5:
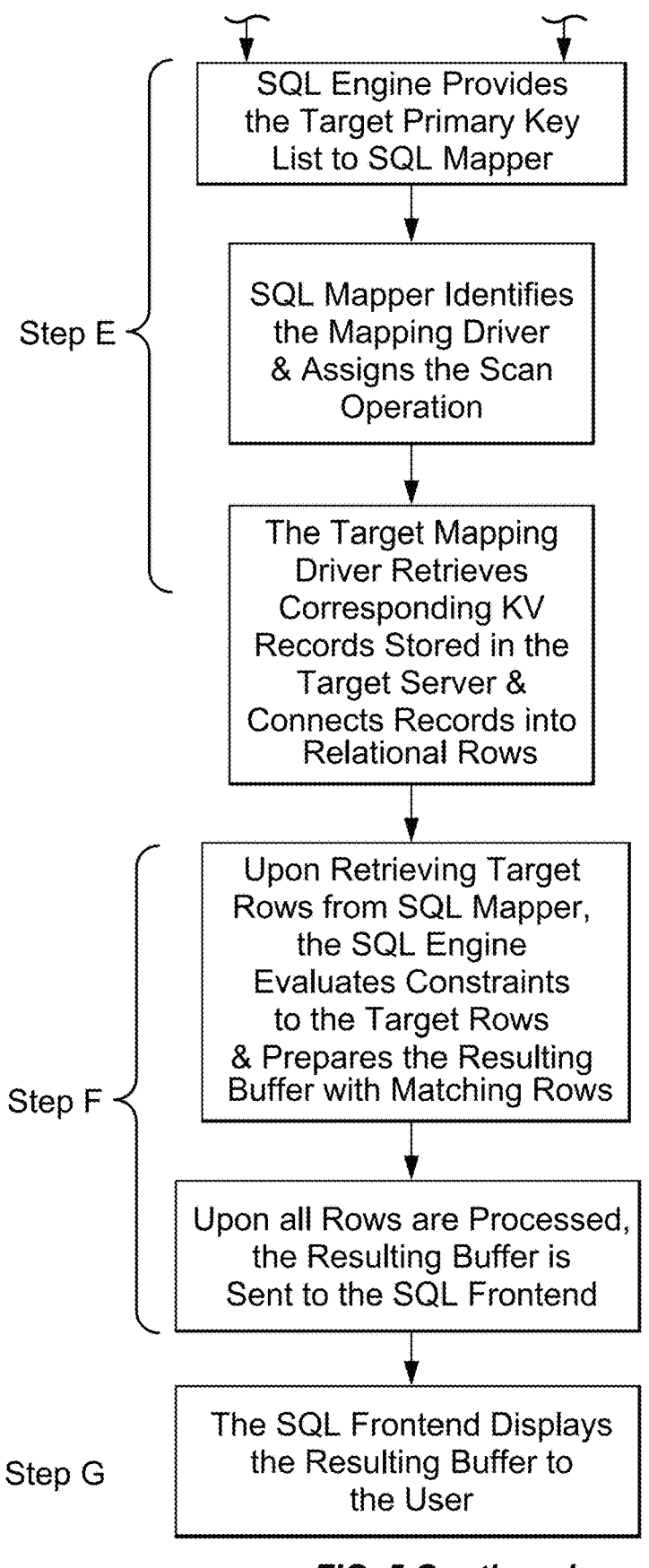
FIG. 5 is a flowchart diagram of the subject metadata exploration service process.

FIG. 5 presents a flowchart diagram of the sequence of operations which the subject system 10, and specifically, the Metadata Exploration Service sub-system 90, performs to dynamically organize a collection of KV records 78, 80 with a specific schema into a relational table 104 "on the fly". The Metadata Exploration Service sub-system 90 runs on a logic which includes the following processing routines:

The subject processing begins in Step A, where a user (also referred to herein as a data generating entity 12) enters a query to a virtual table 110 (e.g., the user issues a metadata exploration request SELECT*FROM fsmeta WHERE size>8192) through the SQL Frontend unit 92, which subsequently parses the query and fetches the information on the target table, e.g., fsmeta. The table information of virtual table 110 includes a distribution policy of the associated system metadata, e.g., FS metadata 78.

Subsequent to Step A, the logic flows to step B where the SQL Frontend unit 92 identifies target servers 22 in accordance with the distribution policy and sends the query to those target servers.

Subsequent to step B, in Step C, upon receiving the query from Step B, the logic running on the target server 22, i.e., the server-side SQL Engine unit 94, retrieves the table information and detects that the target table is a virtual table 110. The SQL Engine unit 94 loads associated mapping driver, e.g., fsmeta mapping driver, for the low level table scan.

Subsequent to Step C, in Step D, the SQL Engine unit 94 checks if any column index exists for the virtual table 110, e.g., fsmeta size column. If the index is available, the SQL Engine unit 94 uses the index to retrieve the target Primary Key list. When the index is not available, the SQL Engine unit 94 creates the target Primary Key list as the entire Primary Key space which leads to the full table scan.

Subsequent to step D, the logic flows to Step E, where the SQL Engine unit 94 provides a target Primary Key list to the SQL Mapper unit 96, which identifies the mapping driver and assigns the scan operation. The target mapping driver, e.g., fsmeta mapping driver, subsequently retrieves the corresponding KV records 78, 80 stored on the target server 22 and converts them to rows in the relational table 104. Upon receipt of the system metadata exploration request from the data generating entity, the system metadata exploration sub-system triggers the converting process (converting to relational rows/table) by producing a mapping driver configured for scanning the at least one relational table, retrieving a target system metadata's primary key using the column index, retrieving corresponding record units stored in the target server, and converting the corresponding record units in relational rows in the at least one relational table.

Upon receiving the system metadata exploration request, the SQL Frontend Processor Unit parses the request, obtains information of a target relational table identifying the at least one target server, and sends the system metadata status changing request to the target server indicated in that request.

Subsequent to Step E, in Step F, upon retrieving target rows from the SQL Mapper unit 96, the SQL Engine unit 94 evaluates the constraints (e.g., size>8192) to the retrieved rows and prepares the resulting buffer with matching rows. When all rows are processed, the resulting buffer is sent to SQL Frontend unit 92 at the client side of the Metadata Exploration Service sub-system 90.

Upon finishing the routine in Step F, the logic proceeds to Step G, where the SQL Frontend unit 92 displays the result to the user 12.

Maintaining Index

In the present methodology, the column index for virtual tables 110 operate differently from the column index for native tables 108, because the subject system does not directly "write" or "update" virtual tables rows, i.e., the virtual rows are written and updated by associated data services, such as file system or object storage, etc. Therefore, when changes occur to the associated system metadata, the subject system must be notified to apply the changes to the index structure accordingly. The Index Updater unit 98 shown in FIG. 4 asynchronously maintains and updates the column index for virtual tables 110, by leveraging the system Event Notifier (i.e., the Infinia Queue unit 100 shown in FIGS. 4 and 6).

Figure 6:
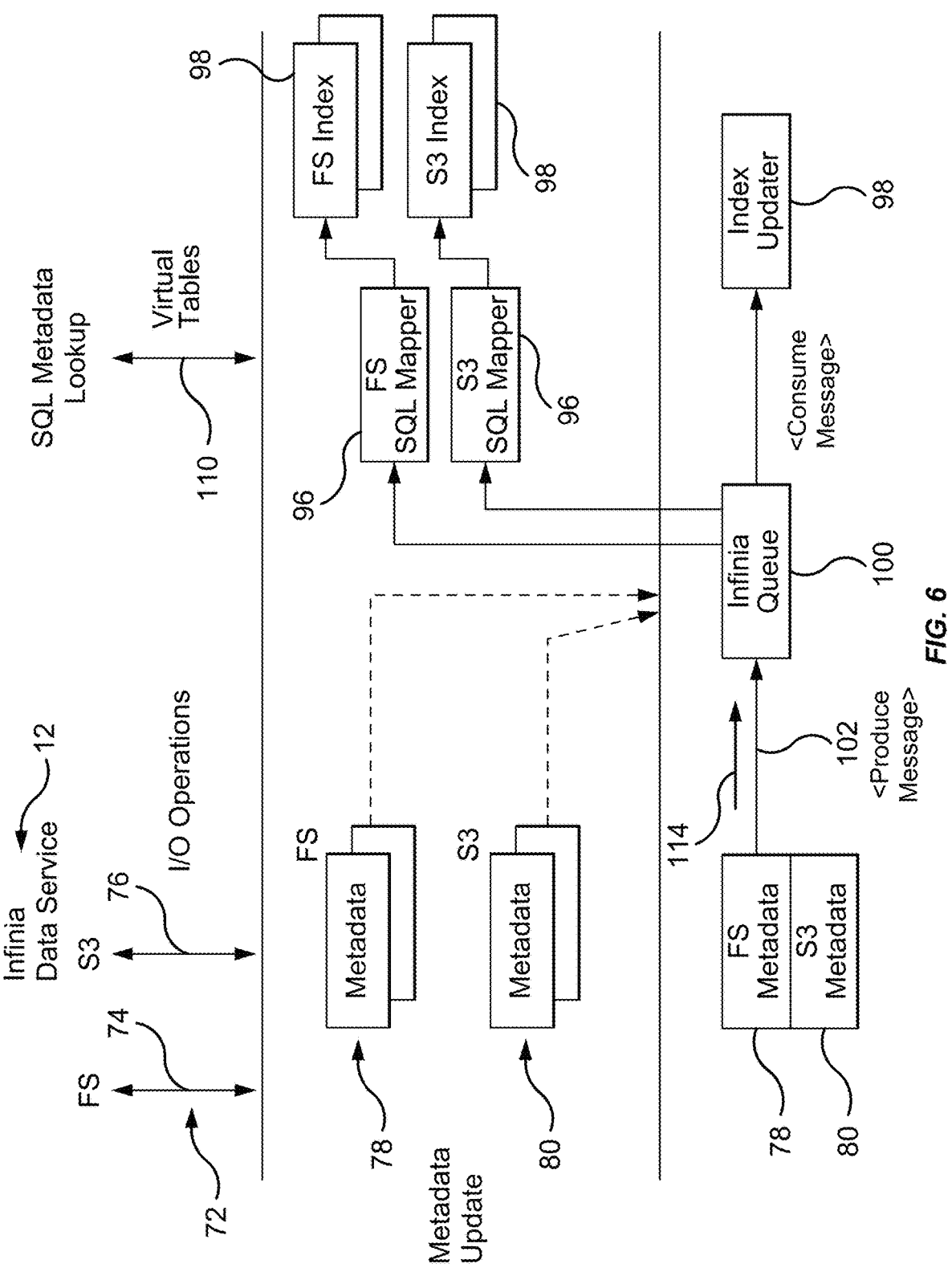
FIG. 6 schematically depicts the asynchronous index update for virtual tables.

FIG. 6 depicts the asynchronous index update process. During the operation of the subject system, the incoming I/O operations 74 and 76 of FS and S3 data services, respectively, result in requested updates of the system (FS) metadata. The data service components 74 and 76 produce messages 114 transmitted to the Infinia Queue unit 100 about such updates delivered to the Infinia Queue unit 100 through communication channel 102. Each message 114 delivered via the channel 102 represents a metadata update event (e.g., new "write" operation leading to changes in the file size and modification timestamp), and contains a payload of the updated metadata record (e.g., updated FS metadata record 78). The Index Updater unit 98 periodically consumes those messages 114 through associated mapping drivers (e.g., fsmeta mapping driver) and updates the index records as required.

The index KV records (e.g., fsmeta size index) are located at the same server with the source metadata (e.g., FS metadata record 78). Therefore, the index update and lookup operations effectively avoid RPCs (Remote Procedure Calls).

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A method for efficient metadata analytics in a distributed data storage system, comprising:

(a) establishing a distributed data storage system containing:

a Central Processing Unit (CPU) sub-system, a storage sub-system operatively coupled to said CPU sub-system with a plurality of storage servers being operatively coupled to said storage sub-system and said CPU sub-system, a system metadata exploration service sub-system operatively integrated with said storage sub-system, and a distributed system metadata storage sub-system operatively coupled to said plurality of storage servers and said system metadata exploration service sub-system, said distributed system metadata storage sub-system being configured with a plurality of system metadata record units and at least one relational table operatively coupled to said plurality of system metadata record units;

(b) operatively coupling at least one data generation entity to said CPU sub-system, said distributed system metadata storage sub-system, and said system metadata exploration service sub-system;

(c) generating at least one system metadata status changing request and at least one metadata exploration request by said at least one data generating entity, said at least one system metadata status changing request including at least one of creating a new storage system metadata request and updating a storage system metadata request, wherein said system metadata is a structured system metadata;

(d) transmitting said at least one system metadata status changing request to said distributed system metadata storage sub-system, resulting in changing a status of at least one of said plurality of system metadata record units in said distributed system metadata storage sub-system;

(e) transmitting said at least one of said plurality of system metadata record units to at least one target server of said plurality of storage servers in accordance with a predetermined distribution policy;

(f) transmitting said at least one metadata exploration request to said system metadata exploration service sub-system and transforming, by said system metadata exploration service sub-system, said structured system metadata associated with said at least one system metadata status changing request into said at least one relational table, and entering said at least one relational table in said distributed system metadata storage sub-system;

(g) mapping, by said system metadata exploration sub-system, said at least one relational table to a predetermined schema adhered to said at least one structured system metadata, and entering said at least one relational table in said distributed system metadata storage sub-system;

(h) maintaining, by said system metadata exploration sub-system, a catalog including said at least one relational table;

(i) registering, by said system metadata exploration sub-system, a name of said at least one relational table and said predetermined schema adhered to said at least one system metadata;

(j) entering, by said system metadata exploration sub-system, a column index for said at least one system metadata in said at least one relational table;

(k) loading, by said system metadata exploration sub-system, a mapping driver configured for scanning said at least one relational table, and retrieving a target system metadata's primary key using said column index;

(l) retrieving, by said mapping driver, corresponding record units stored in said target server, and, in accordance with said at least one metadata exploration request, converting said corresponding record units in relational rows in said at least one relational table;

(m) generating a resulting buffer containing a plurality of rows matching said relational rows; and (n) providing said resulting buffer to said at least one data generating entity upon a plurality of relational rows in said relational table have been scanned.

2. The method of claim 1, further comprising:

in said step (a), configuring said system metadata exploration service sub-system with an SQL (Structured Query Language) Frontend Processor Unit operatively coupled to said at least one data generating entity, an SQL Engine Processor Unit operatively coupled to said SQL Frontend Processor Unit, an Index Processor Unit operatively coupled to said SQL Engine Processor Unit, and an Infinia Queue Processor Unit operatively coupled to said Index Update Processor Unit.

3. The method of claim 2, further comprising:

in said step (a), configuring said SQL Frontend Processor Unit with a command communication channel for interacting of said distributed system metadata storage sub-system with said at least one data generating entity, and in said step (d), upon sending said at least one system metadata status changing request through said SQL Frontend Processor Unit, parsing, by said SQL Frontend Processor Unit, said at least one system metadata status changing request, obtaining information of a target relational table identifying said at least one target server, and sending said at least one system metadata status changing request to said at least one target server.

4. The method of claim 3, further comprising:

in said step (e), upon receiving said at least one system metadata status changing request at said target server, retrieving, by said SQL Engine Processor Unit, the target relational table information, detecting a type of said target relational table, said type being selected from a group consisting of a virtual relational table and a native relational table, and in said step (k), loading said mapping driver associated with said target relational table for a low-level target relational table scan operation.

5. The method of claim 4, further including:

in said step (j), checking, by said SQL Engine Processor Unit, if a column index exists for said target relational table, and, if the column index is available, using the column index to retrieve the target primary key list, and, if the column index is not available, creating, by said SQL Engine Processor Unit, the target primary key list as the entire primary key space, and performing a full scan operation for the target relational table.

6. The method of claim 5, further comprising:

in said step (k), transmitting said target primary key list from said SQL Engine Processor Unit to said SQL Mapper Processor Unit, identifying, by said SQL Mapper Processor Unit the mapping driver associated with said target relational table, and assigning said scan operation.

7. The method of claim 6, further comprising:

upon obtaining said relational rows from said SQL Mapper Processor Unit in said step (l), evaluating by said SQL Engine Processor Unit, constraints to said relational rows, in said step (m), preparing the resulting buffer with rows matching said relational rows, and in said step (n), upon processing said relational rows, sending said resulting buffer to said SQL Frontend Processor Unit.

8. The method of claim 7, further comprising:

in said step (b), interfacing said at least one data generating entity with said at least one relational table.

9. The method of claim 8, further comprising:

in said at least one relational table, configuring said at least one system metadata record unit with a key index and a value index, wherein said key index serves as a primary key for said relational row in said at least one relational table, and creating at least one column index for said at least one system metadata record unit, said at least one column index corresponding to said primary key of said relational row and said value index of said at least one system metadata record unit.

10. The method of claim 9, further comprising:

upon said at least one system metadata has been exposed to said at least one status changing request, notifying said system metadata exploration service sub-system of said at least one system metadata status change, and applying changes to said key index and value index in accordance to said at least one system metadata status change, and asynchronously updating said column index by said SQL Index Update Processor Unit.

11. The method of claim 10, further comprising:

in said step (d), upon changing the status of said at least one system metadata, producing a message to said Infinia Queue Processor Unit corresponding to said at least one system metadata status change, consuming said message by said Index Updater Processor Unit, and updating said key index and value index according to said message.

12. The method of claim 11, further comprising:

configuring said plurality of system metadata record units in a distributed group of File System (FS) metadata updated responsive to File I/O operations included in said at least one system metadata status change request received from said at least one data generating entity, and a distributed group of Object Metadata updated responsive to object I/O operations included in said at least one system metadata status change request received from said at least one data generating entity.

13. The method of claim 12, further comprising:
configuring said at least one relational table as a virtual table related to said group of FS metadata or Object metadata.

14. The method of claim 13, further comprising:
in said step (e), configuring said predetermined distribution policy is a distributed hashing.

15. A distributed data storage system configured for efficient metadata analytics, comprising:
a Central Processing Unit (CPU) sub-system,
a storage sub-system operatively coupled to said CPU sub-system with a plurality of storage servers being operatively coupled to said storage sub-system and said CPU sub-system,
a system metadata exploration service sub-system operatively integrated with said storage sub-system, and
a distributed system metadata storage sub-system operatively coupled to said plurality of storage servers and said system metadata exploration service sub-system, said distributed system metadata storage sub-system being configured with a plurality of system metadata record units and at least one relational table operatively coupled to said plurality of system metadata record units;
at least one data generation entity operatively coupled to said CPU sub-system, said distributed system metadata storage sub-system, and said system metadata exploration service sub-system, said at least one data generating entity being configured for generating and transmitting to said distributed system metadata storage sub-system at least one system metadata status changing request including at least one of creating a new storage system metadata request and updating a storage system metadata request, and for generating and transmitting to said system metadata exploration sub-system at least one system metadata exploration request, wherein said system metadata is a structured system metadata, wherein transmitting said at least one system metadata status changing request to said distributed system metadata storage sub-system results in changing a status of at least one of said plurality of system metadata record units in said distributed system metadata storage sub-system, and wherein said at least one of said plurality of system metadata record units is configured for being transmitted to at least one target server of said plurality of storage servers in accordance with a predetermined distribution policy;
said system metadata exploration service sub-system being configured to:
transform said structured system metadata into said at least one relational table,
enter said at least one relational table in said distributed system metadata storage sub-system, map said at least one relational table to a predetermined schema adhered to said at least one structured system metadata,
enter said at least one relational table in said distributed system metadata storage sub-system, maintaining a catalog including said at least one relational table, register a name of said at least one relational table and said predetermined schema adhered to said at least one system metadata,
enter a column index for said at least one system metadata in said at least one relational table,
load a mapping driver configured for scanning said at least one relational table, and for retrieving a target system metadata's primary key using said column index and corresponding record units stored in said target server, and, responsive to receipt of said at least one system metadata exploration request, converting said corresponding record units in relational rows in said at least one relational table, and
generate a resulting buffer containing a plurality of rows matching said relational rows for providing said resulting buffer to said at least one data generating entity upon a plurality of relational rows in said relational table have been scanned.

16. The system of claim 15, wherein said system metadata exploration service sub-system is further configured with:
a SQL (Structured Query Language) Frontend Processor Unit operatively coupled to said at least one data generating entity, an SQL Engine Processor Unit operatively coupled to said SQL Frontend Processor Unit, an Index Processor Unit operatively coupled to said SQL Engine Processor Unit, and an Infinia Queue Processor Unit operatively coupled to said Index Update Processor Unit.

17. The system of claim 16, wherein said SQL Frontend Processor unit is configured for, responsive to said at least one system metadata status changing request, parsing said at least one system metadata status changing request for obtaining information of a target relational table identifying said at least one target server, and sending said at least one system metadata status changing request to said at least one target server, and
wherein said SQL Engine Processor Unit is configured for, upon receiving said at least one system metadata status changing request at said target server, retrieving the target relational table information, detecting a type of said target relational table, said type being selected from a group consisting of a virtual relational table and a native relational table, and loading said mapping driver associated with said target relational table for a low-level target relational table scan operation.

18. The system of claim 17, wherein said SQL Engine Processor Unit is further configured for checking if a column index exists for said target relational table, if the column index is available, using the column index to retrieve the target primary key list, and,
if the column index is not available, creating the target primary key list as the entire primary key space, and performing a full scan operation for the target relational table, and transmitting said target primary key list to said SQL Mapper Processor Unit for, identifying the mapping driver associated with said target relational table, and assigning said scan operation.

19. The system of claim 18, wherein said at least one system metadata record unit is configured with a key index and a value index, wherein said key index serves as a primary key for said relational row in said at least one relational table,
wherein said at least one column index corresponds to said primary key of said relational row and said value index of said at least one system metadata record unit, and

wherein, said system metadata exploration service sub-
system is further configured to, upon said at least one
system metadata has been exposed to said at least one
status changing request, notify of said at least one
system metadata status change, apply changes to said
key index and value index in accordance to said at least
one system metadata status change, and asynchro-
nously update said column index.

20. The system of claim 19, wherein said plurality of
system metadata record units are further configured in a
distributed group of File System (FS) metadata updated
responsive to File I/O operations included in said at least one
system metadata status change request received from said at
least one data generating entity, and a distributed group of
Object Metadata updated responsive to object I/O operations
included in said at least one system metadata status change
request received from said at least one data generating entity,
and wherein said at least one relational table is configured as
a virtual table related to said group of FS metadata or Object
metadata.

* * * * *